(12) United States Patent
Hu et al.

(10) Patent No.: US 10,940,444 B2
(45) Date of Patent: Mar. 9, 2021

(54) MEMBRANES AND METHODS OF USE THEREOF

(71) Applicant: University of Maryland, College Park, MD (US)

(72) Inventors: Liangbing Hu, Hyattsville, MD (US); Fengjuan Chen, Hyattsville, MD (US); Amy Gong, Hyattsville, MD (US)

(73) Assignee: University of Maryland, College Park, College Park, MD (US)

( * ) Notice: Subject to any disclaimer, the term of this patent is extended or adjusted under 35 U.S.C. 154(b) by 66 days.

(21) Appl. No.: 15/923,871

(22) Filed: Mar. 16, 2018

(65) Prior Publication Data

US 2018/0264414 A1    Sep. 20, 2018

Related U.S. Application Data

(60) Provisional application No. 62/472,399, filed on Mar. 16, 2017, provisional application No. 62/644,155, filed on Mar. 16, 2018.

(51) Int. Cl.
*B01D 69/14* (2006.01)
*B01D 71/10* (2006.01)
(Continued)

(52) U.S. Cl.
CPC ....... *B01D 69/141* (2013.01); *B01D 67/0083* (2013.01); *B01D 67/0088* (2013.01);
(Continued)

(58) Field of Classification Search
CPC .... B01D 67/0079; B01D 69/10; B01D 69/12; B01D 71/022; B01D 61/02; C02F 1/001; C02F 2305/08; B29C 55/12; B82Y 30/00
See application file for complete search history.

(56) References Cited

U.S. PATENT DOCUMENTS 681,884 A    9/1901  Monjeau
6,277,274 B1    8/2001  Coffman
(Continued)

FOREIGN PATENT DOCUMENTS

DE      10327988 B4    5/2009
WO    2006034717 A1    4/2006
WO   WO2018/160871   *  9/2018   ............. B01D 71/56

OTHER PUBLICATIONS

Chou et al., "The Preparation and Characterization of Silver-Loading Cellulose Acetate Hollow Fiber Membrane for Water Treatment," Polymers for Advanced Technologies, Jun. 24, 2005, pp. 600-607, vol. 16, Issue 8.
(Continued)

*Primary Examiner* — Ana M Fortuna
(74) *Attorney, Agent, or Firm* — George Likourezos; Carter, DeLuca & Farrell LLP

(57) ABSTRACT

Systems and methods for treating a membrane are described. The method includes causing a nanomaterial to contact at least a portion of a wall of at least on channel extending through a membrane, and causing the nanomaterial to adhere to the portion of the wall of the at least one channel. A fluid filtration system is also described. The filtration system includes a housing and a filter membrane. The housing may have a reservoir and a filter compartment. The filter membrane may have a channel extending therethrough. The channel may have a plurality of micropores along a wall thereof. The filter compartment may be configured to receive the filter membrane therein, the filter membrane configured to guide fluid thereacross to remove substances from the fluid or to modify substances in the fluid.

26 Claims, 11 Drawing Sheets

(51) Int. Cl.
  *B01D 67/00* (2006.01)
  *C02F 1/44* (2006.01)
  *B01D 69/02* (2006.01)
  *B01D 69/10* (2006.01)
  *B01D 71/06* (2006.01)
  *B01D 71/02* (2006.01)
  *C02F 101/30* (2006.01)
  *C02F 103/00* (2006.01)
  *C02F 101/10* (2006.01)

(52) U.S. Cl.
  CPC ............ *B01D 69/02* (2013.01); *B01D 69/10* (2013.01); *B01D 71/06* (2013.01); *B01D 71/10* (2013.01); *C02F 1/44* (2013.01); *B01D 71/021* (2013.01); *B01D 71/022* (2013.01); *B01D 71/024* (2013.01); *B01D 2325/08* (2013.01); *C02F 2101/10* (2013.01); *C02F 2101/308* (2013.01); *C02F 2103/001* (2013.01); *C02F 2305/08* (2013.01)

(56) References Cited

U.S. PATENT DOCUMENTS

| | | | |
|---|---|---|---|
| 6,780,466 B2 | 8/2004 | Grangeon et al. | |
| 6,805,730 B2 * | 10/2004 | Herczeg | B01D 63/02 210/321.8 |
| 2006/0032329 A1 * | 2/2006 | Rubinstein | C25D 7/04 75/255 |
| 2010/0006503 A1 * | 1/2010 | Bratton | B01D 61/362 210/650 |
| 2010/0059434 A1 * | 3/2010 | Bishop | B01D 63/066 210/490 |
| 2011/0168560 A1 * | 7/2011 | Afzali-Ardakani | B01D 61/025 204/521 |
| 2011/0186492 A1 | 8/2011 | Holtz | |
| 2013/0062279 A1 | 3/2013 | Bhattacharyya et al. | |
| 2015/0096935 A1 | 4/2015 | Mitra et al. | |
| 2016/0346739 A1 * | 12/2016 | Panglisch | B01D 61/18 |
| 2017/0014780 A1 * | 1/2017 | Birss | H01M 4/8807 |
| 2017/0232402 A1 * | 8/2017 | Xiao | B01D 69/12 210/500.23 |

OTHER PUBLICATIONS

Chen et al., "Mesoporous, Three-Dimensional Wood Membrane Decorated with Nanoparticles for Highly Efficient Water Treatment," ACS Nano Publications, American Chemical Society, Mar. 31, 2017, pp. 4275-7282, vol. 11, Issue 4.

Ahnen et al., "Optimizing Nitrate Removal in Woodchip Beds Treating Aquaculture Effluents," Aquaculture, Feb. 24, 2016, pp. 47-54, vol. 458.

International Search Report and Written Opinion dated Jul. 23, 2018 in corresponding International Application No. PCT/US18/22979.

International Preliminary Report on Patentability dated Sep. 26, 2019 in corresponding International Application No. PCT/US18/22979.

* cited by examiner

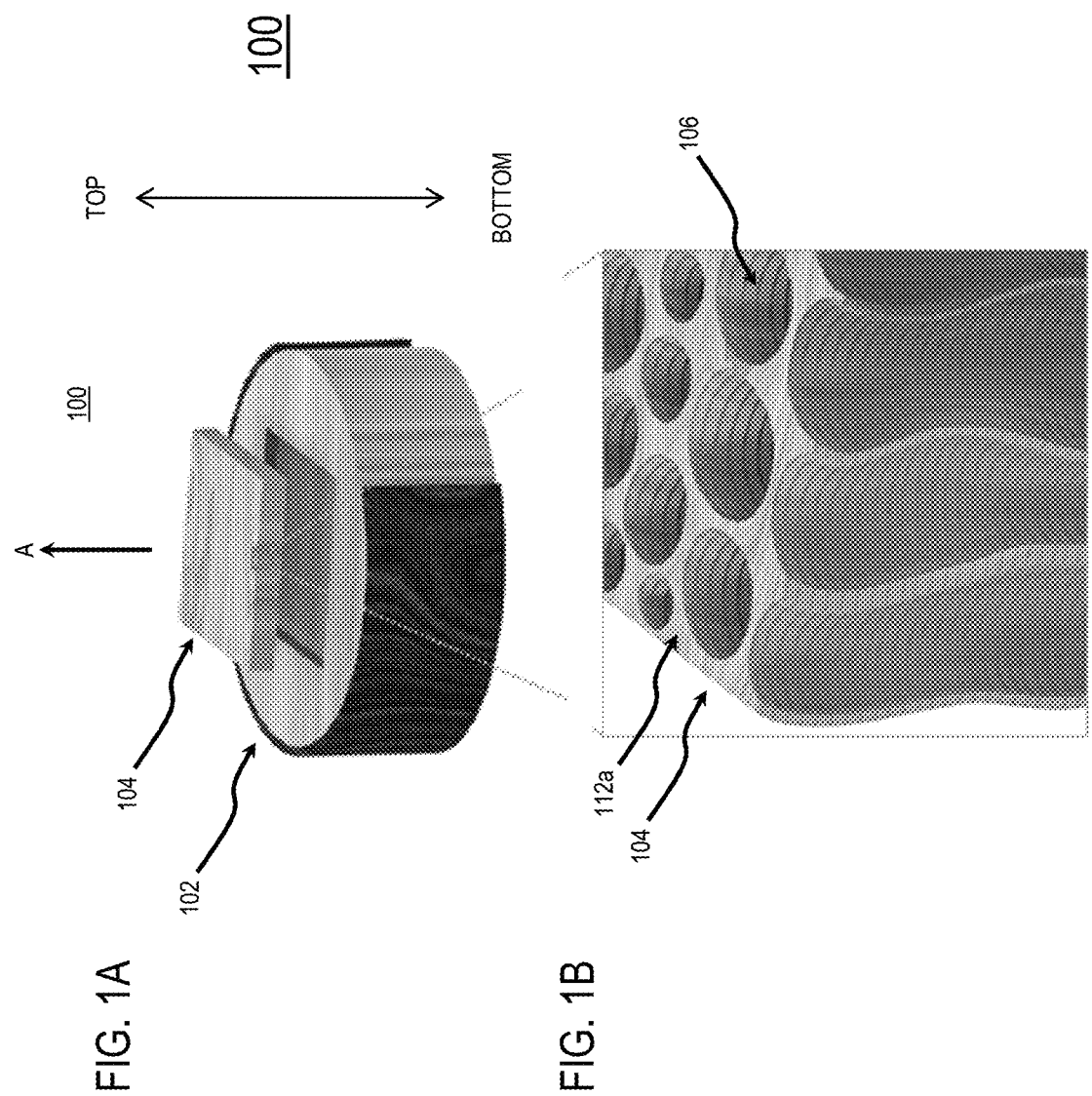

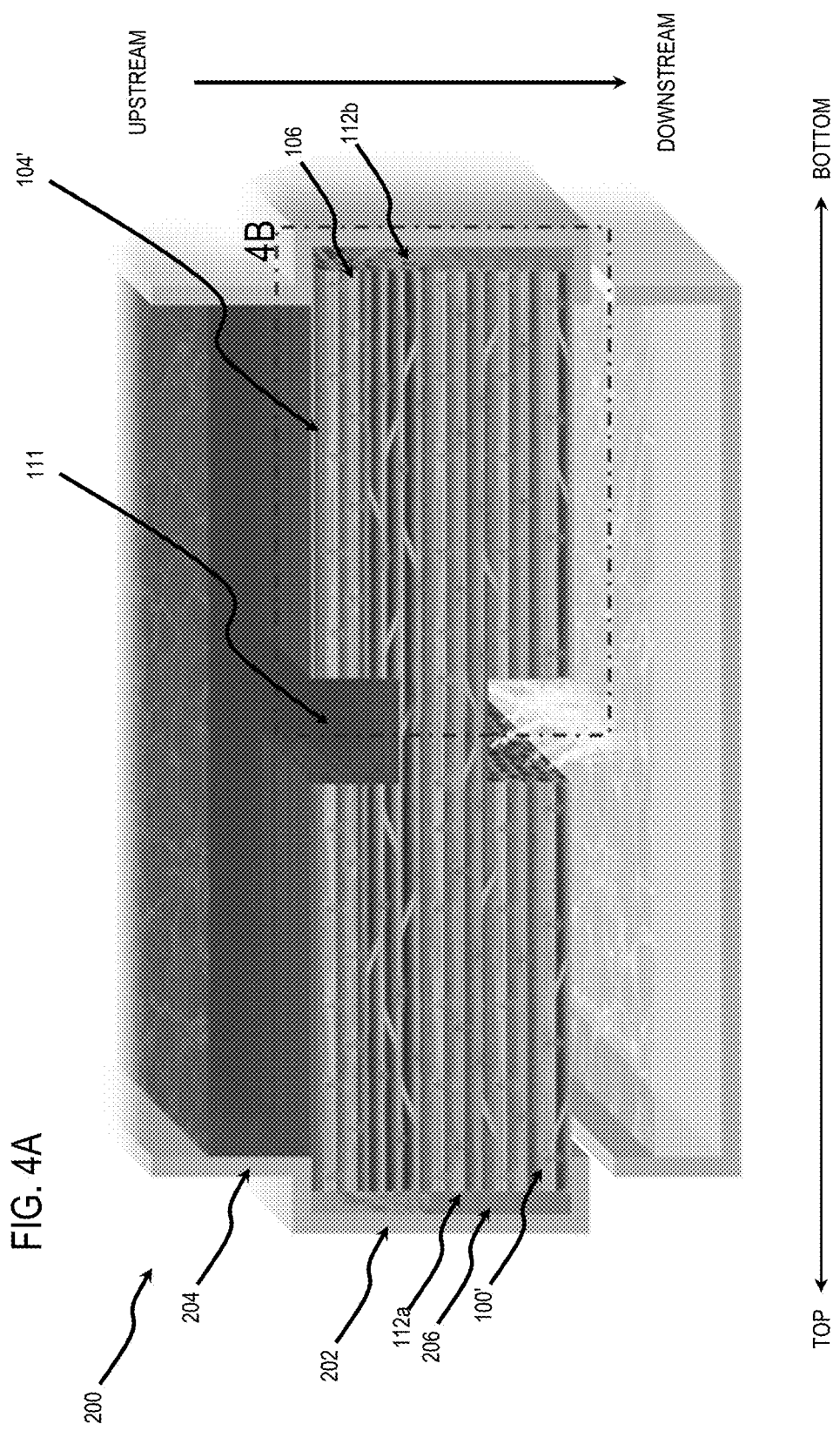

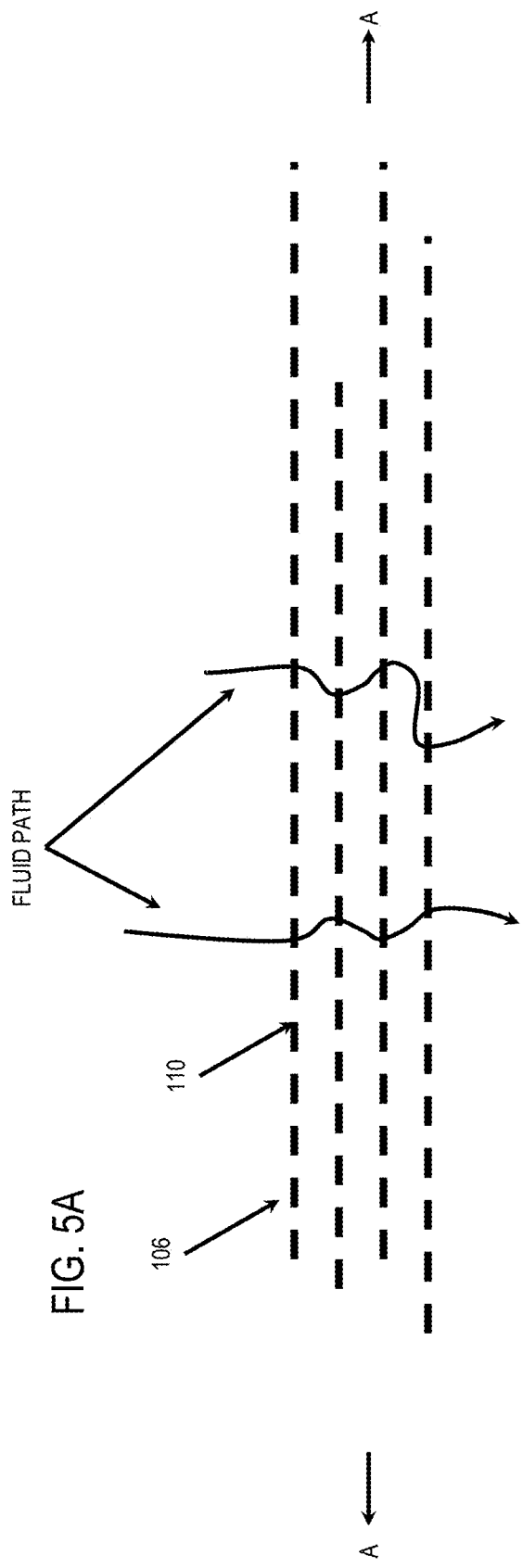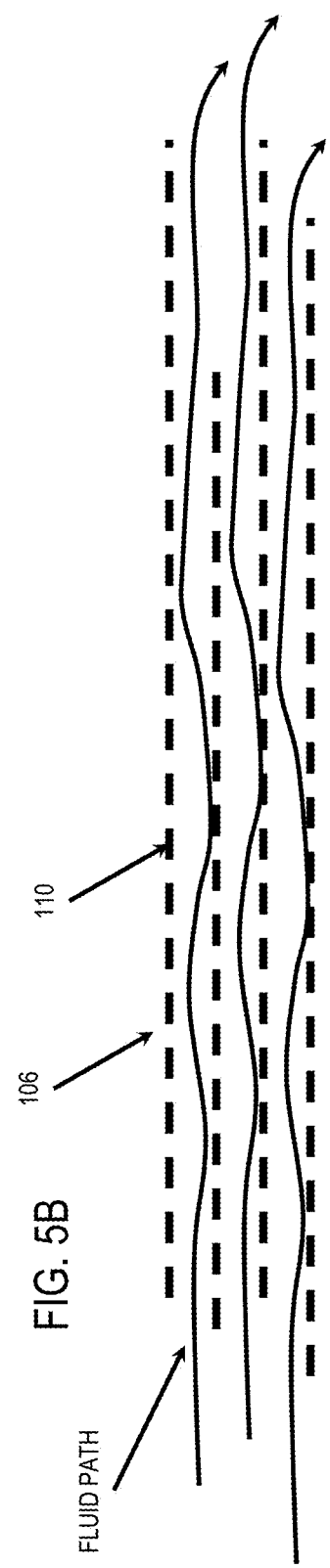

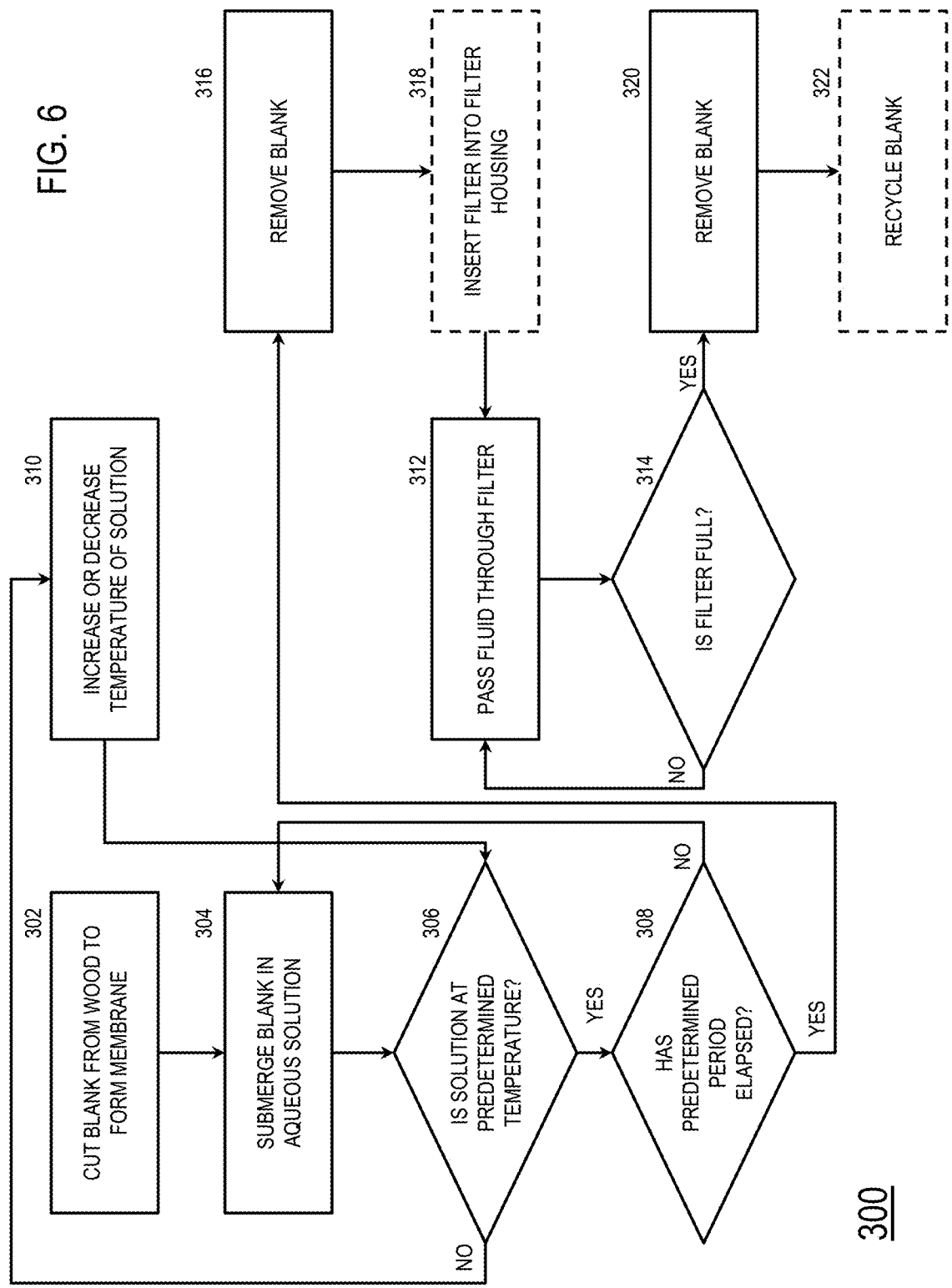

MEMBRANES AND METHODS OF USE THEREOF

CROSS-REFERENCE TO RELATED APPLICATION

This application claims the benefit of, and priority to, U.S. Provisional Patent Application No. 62/472,399 entitled "WOOD-BASED MEMBRANES," filed on Mar. 16, 2017, and U.S. Provisional Patent Application No. 62/644,155 entitled "LONGITUDINAL MESOPOROUS WOOD MEMBRANE FOR RAPID HIGH CONCENTRATION WASTEWATER TREATMENT," filed on Mar. 16, 2018, the contents of both of which are hereby incorporated by reference in their entirety.

BACKGROUND

Technical Field

The present disclosure relates generally to membranes for altering fluids and, more particularly, to systems and methods for positioning nanomaterials in membranes to enhance fluid alteration.

Related Art

The developments of certain industries have led to the release of increasingly large amounts of contaminants, such as metal ions, organic dyes, and cleaning agents. The release of such contaminants is one of the key factors influencing water pollution, and has become a serious environmental issue. While a variety of filtering methods exist (e.g., physical adsorption, photocatalytic degradation, chemical oxidation, and membrane filtration), such systems that implement such methods are often bulky, cumbersome, and may cause the release of contaminants during manufacture.

SUMMARY

Existing challenges associated with the foregoing, as well as other challenges, are overcome by methods for altering fluids, such as filtering contaminants from a fluid, and also by systems and apparatuses that operate in accordance with these methods.

According to example embodiments of the present disclosure, a method of treating a membrane is disclosed. The method includes causing a nanomaterial to contact at least a portion of a wall of at least on channel extending through a membrane; and causing the nanomaterial to adhere to the portion of the wall of the at least one channel.

In aspects, the method includes cutting the membrane across the at least one channel.

According to aspects, cutting the membrane includes cutting the membrane at an angle with respect to the at least one channel.

In aspects the method includes forming a pattern in at least one of a top portion of the membrane or a bottom portion of the membrane.

According to aspects, the pattern may be selected from the group consisting of a hatch pattern, a saw-tooth pattern, a pattern that optimizes performance of the membrane, and a pattern that optimizes a flow rate of a fluid flowing through the at least one channel of the membrane.

In aspects, the method includes cutting a first trench across at least one of an upstream portion of the membrane or a downstream portion of the membrane.

According to aspects, the method includes cutting a second trench across the at least one of the upstream portion of the membrane or the downstream portion of the membrane so that the second trench intersects the first trench.

In aspects, causing the nanomaterial to contact the portion of the wall of the at least one channel includes at least partially submerging the membrane in an aqueous solution having nanoparticles suspended therein.

According to aspects, curing includes at least one of curing the membrane, increasing a temperature of the membrane to a predetermined temperature, or charring the membrane.

In aspects, the nanomaterial includes at least one of nanoparticles, nanowires, nanotubes, or graphene.

According to aspects, the nanomaterial is made from at least one of titanium dioxide, a metal, an oxide, a polymer, gold, copper, nickel, silver, or an alloy.

In aspects, the membrane is wood.

According to aspects, the wood is selected from the group consisting of surface-treated wood, wood including layers of different types of wood, heat-treated wood, natural wood, synthetic wood, partially delignified wood, completely delignified wood, and carbonized wood.

According to an example embodiment of the present disclosure, a fluid filtration system is disclosed. The fluid filtration system includes a housing and a filter membrane. The housing has a reservoir and a filter compartment. The filter membrane has a channel extending therethrough. The channel may have a plurality of micropores along a wall of the channel. The filter compartment may be configured to receive the filter membrane therein. The filter membrane may be configured to guide fluid thereacross to remove substances from the fluid or to modify substances in the fluid.

In aspects, the filter compartment is configured to extend past at least one end portion of the filter membrane to form a cavity between the filter compartment and the end portion of the filter membrane.

According to aspects, the fluid is guided from a first channel having a plurality of micropores to a second channel.

In aspects, at least one channel has a nanomaterial disposed along at least a portion of a wall of the at least one channel.

According to aspects, the filter membrane has an upstream channel portion and a downstream channel portion. The upstream channel portion may be configured to guide fluid in a first direction and the downstream channel portion configured to guide fluid in a second direction.

In aspects, the upstream channel portion and the downstream channel portion are configured to guide fluid in a cascade configuration.

According to aspects, the membrane has a first trench extending along an upstream surface of the filter membrane.

In aspects, the membrane has a second trench extending along a downstream surface of the filter membrane.

According to example embodiments of the present disclosure, a membrane is disclosed. The membrane includes a plurality of channels and a nanomaterial. The plurality of channels extends from an upper portion of the membrane toward a lower portion of the membrane. The nanomaterial is disposed along walls of the plurality of channels. The nanomaterial may be configured to chemically interact with contaminated fluid flowing through the plurality of channels of the membrane.

According to aspects, the membrane is cut along at least one of the channels.

In aspects, the membrane is cut at an angle relative to at least one of the channels.

According to aspects, a pattern is formed along either the upper portion of the membrane, the lower portion of the membrane, an upstream portion of the membrane, or a downstream portion of the membrane.

In aspects, the pattern is selected from the group consisting of a hatch pattern, a saw-tooth pattern, a pattern that optimizes performance of the membrane, and a pattern that optimizes a flow rate of a fluid flowing through at least one channel of the membrane.

According to aspects, a first trench is cut across at least one of the upstream portion of the membrane of the downstream portion of the membrane.

In aspects, a second trench is cut across at least one of the upstream portion of the membrane or the downstream portion of the membrane. The second trench may intersect the first trench.

According to aspects, the nanomaterial may include at least one of nanoparticles, nanowires, nanotubes, or graphene.

In aspects, the nanomaterial is formed of a material selected from the group consisting of titanium dioxide, a metal, an oxide, a polymer, gold, copper, nickel, silver, an alloy, and any combination thereof.

According to aspects, the membrane wood selected from the group consisting of surface-treated wood, wood including layers of different types of wood, heat-treated wood, natural wood, synthetic wood, partially delignified wood, completely delignified wood, carbonized wood, and any combination thereof.

BRIEF DESCRIPTION OF THE DRAWINGS

The accompanying drawings, which are incorporated in and constitute a part of the specification, illustrate embodiments of the disclosure and together with a general description of the disclosure given above, and the detailed description of the embodiment(s) given below, serve to explain the principles of the present disclosure.

FIG. 1A is a perspective view of a membrane in accordance with embodiments of the present disclosure;

FIG. 1B is a detailed view of a portion of the membrane of FIG. 1A;

FIG. 4A is a perspective view of a filtration system according to embodiments of the present disclosure;

FIG. 5A is a diagram of a dead-end filtration path according to embodiments of the present disclosure;

FIG. 5B is a diagram of a cross-flow filtration path according to embodiments of the present disclosure;

FIG. 6 is a flow diagram illustrating a method for preparing the membrane of FIG. 1A for filtration in accordance with embodiments of the present disclosure;

DETAILED DESCRIPTION

Figure 2A:
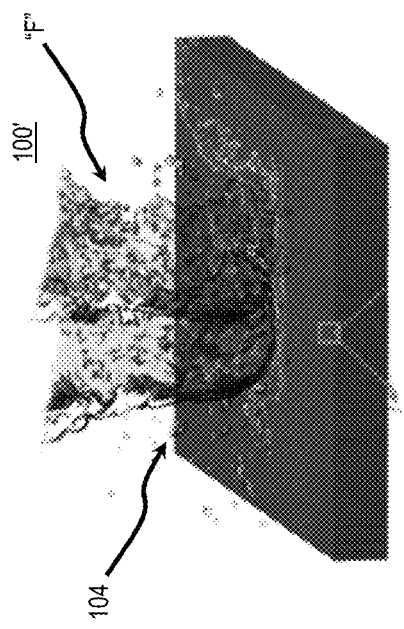
FIG. 2A is a perspective view of the membrane of FIG. 1 having nanomaterials disposed therein.

Embodiments of the presently described filtration systems and methods are described in detail with reference to the drawings, in which like or corresponding reference numerals designate identical or corresponding elements in each of the several views.

Wood, which is a commonly-used, earth-abundant, material has a mesoporous structure, comprised of many long, aligned, channels (lumens), which extend along the direction in which a tree grows. By virtue of this structure, wood may be cut and/or treated to form a three-dimensional (3D) mesoporous membrane. The 3D membrane may further be treated to incorporate nanomaterials, such as palladium nanoparticles (Pd NPs) for treating fluids (e.g., wastewater, runoff, etc.). When used for filtering, many distinct advantages result including, without limitation, allowing for fast water flow without significant, if any, agglomeration; and increasing the interaction of flowing wastewater with the nanomaterials by virtue of the asymmetrical curvatures of the aligned channels.

Reference will now be made to terms used herein which assist in describing the principles of the present disclosure. As used herein, the term "upstream" refers to portions of the associated element located or contacted earlier along a filtration stream or path, and the term "downstream" refers to portions of the associated element located or contacted later along the filtration stream or path. The term "filtration stream" refers generally to a path along which a fluid (e.g., gas or liquid) is guided during filtration.

Referring now to FIGS. 1A and 1B, illustrated is a wood block 102 removed from a portion of a tree (not shown) from which a wood membrane or membrane 104 may be extracted. While the present disclosure describes the treatment and use of wood as blanks or membranes 104 to filter fluids, it is contemplated that other organic and/or synthetic materials may be used to form synthetic membranes or synthetic blanks (not shown) which retain a structure similar to the structures described by the present disclosure. It will be further understood that treated forms of wood, such as delignified wood (e.g., wood in which the lignin is removed therefrom via a mechanical or chemical process) are contemplated as being used as an alternative to, or in addition to, untreated wood.

The membrane 104 has a mesostructure (e.g., xylem, phloem, heartwood, or suitable combinations and/or portions thereof) which includes walls that extend therethrough to form xylem or channels 106. The channels 106 extend from a top or upstream portion to a bottom or downstream portion of the membrane 104 along an axis A-A. The channels 106, during the life of the tree, act as passageways which allow for transportation of water and nutrients (e.g., salts) from the tree's roots to the tree's branches and leaves (not shown). As the tree grows, the channels 106 extend along the wood blocks 102 which, when combined to form a trunk of the tree, are formed and extend along the trunk. As shown in FIG. 1B, the channels 106 are curved such that, as the channels 106 extend along the axis A-A, they form varying arcuate profiles without repeating any pattern. By virtue of the channels 106, as fluid passes therethrough, the fluid comes in contact with, and is directed by, the walls of the channels 106, and any particulates disposed on the walls.

It is contemplated that, in embodiments, channels of synthetic membranes may be formed (e.g., 3D printed, bored, cut via a laser, etc.) such that the channels have substantially arcuate profiles. The channels having substantially arcuate profiles may be in symmetrical and/or asymmetrical relation to one another. In further embodiments, the channels of the synthetic membranes may form patterns (e.g., zig-zag patterns, recurring arcuate patterns, etc.) to induce the collision of fluid passing therethrough with the walls of the channels. Additionally or alternatively, the channels of the synthetic membrane may vary in width to modulate the fluid flow rate. In embodiments, synthetic materials may be freeze-dried to cause pores to form along surfaces of the freeze-dried materials.

The channels 106 may have nanomaterials 108 (e.g., nanomaterials such as nanoparticles, nanotubes, graphene, nanowires, etc.) (see FIG. 2B) disposed therein. While it is contemplated that metallic nanomaterials such as, without limitation, Palladium (Pd), Gold (Au), Copper (Cu), Nickel (Ni), and Silver (Ag) nanoparticles, other metal nanoparticles, alloy nanoparticles, oxide nanoparticles, and the like, may be disposed in the channels 106, for purposes of clarity, reference will be made generally to the application of nanomaterials 108 to the walls of the channels 106 of the membrane 104. In addition to nanoparticles, nanomaterials such as nanowires may be introduced and disposed along the interior walls of the channels 106 in place of, or in addition to, the nanoparticles or other nanomaterials.

Figure 2B:
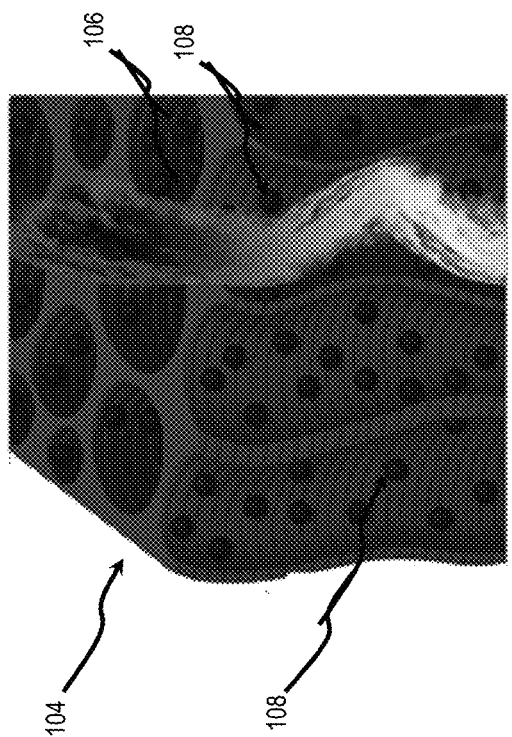
FIG. 2B is a detailed perspective view of a portion of the membrane of FIG. 2A.
Figure 3B:
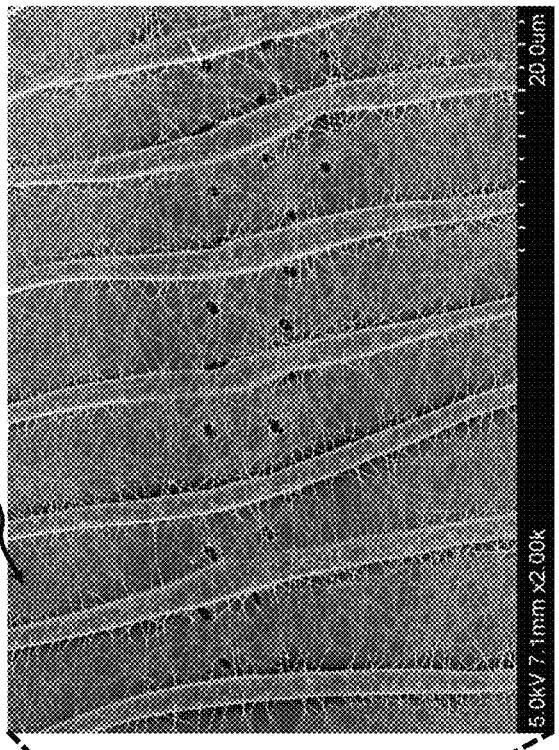
FIGS. 3A-3D are detailed plan views of a plurality of channels of the membrane of FIG. 2A having a plurality of nanowires disposed therein, each view in successively greater magnification.
Figure 3A:
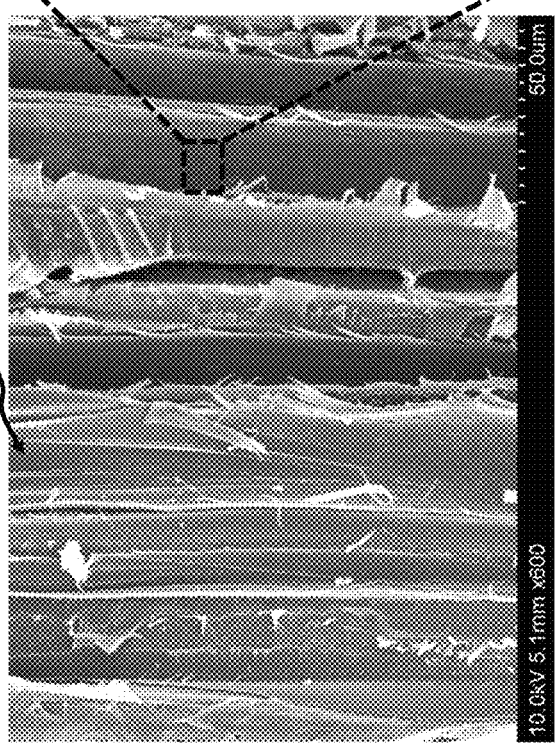
Figure 3C:
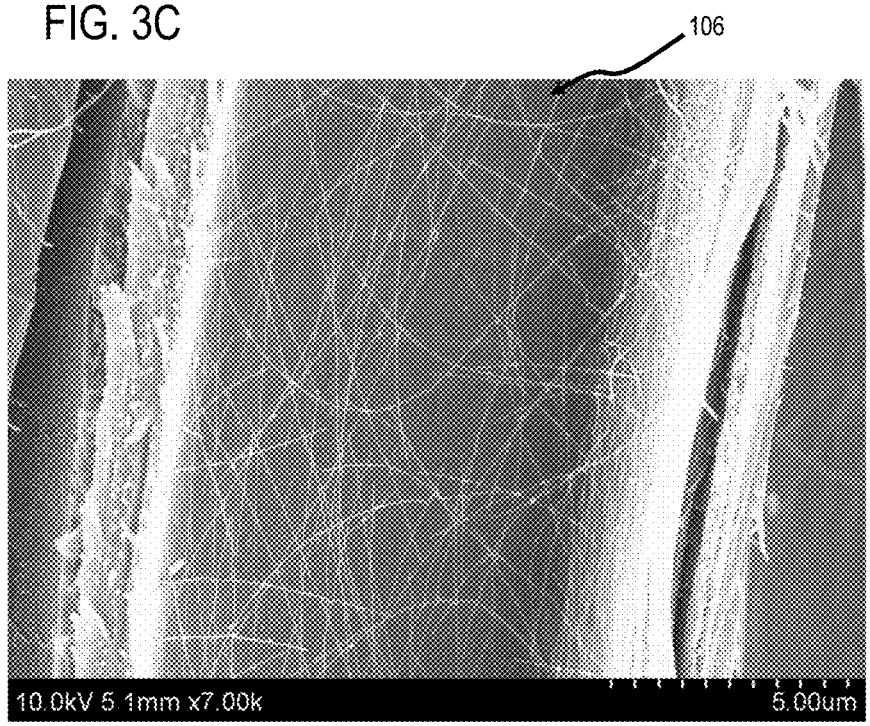
Figure 3D:
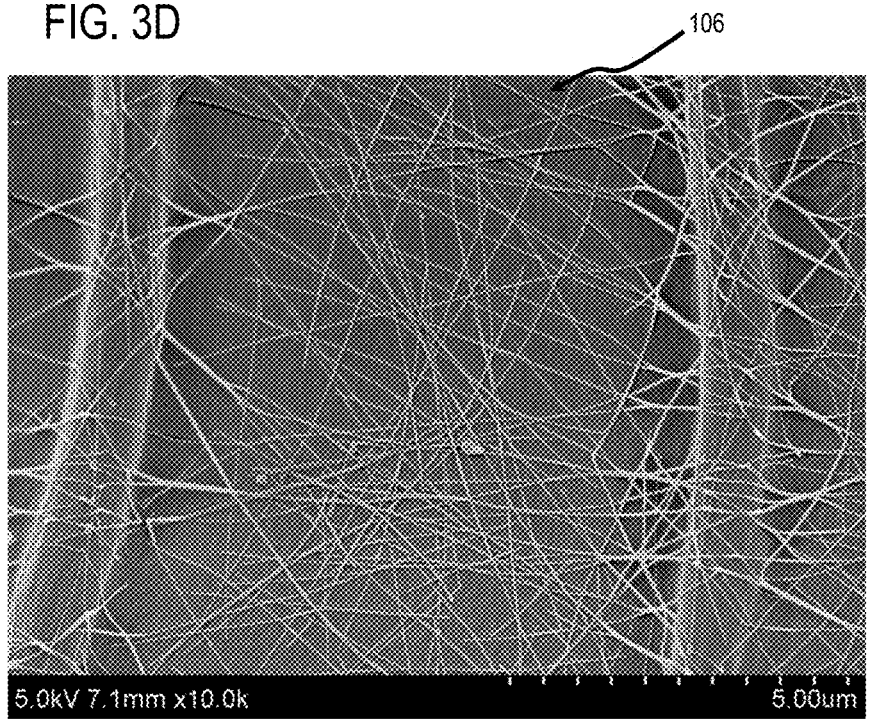

Referring now to FIGS. 2A and 2B, fluid "F" may be guided through the channels 106 of the membrane 104. The fluid "F" may contain contaminants (not explicitly shown) (e.g., organic dyes, heavy metals, oils, and the like) which are either suspended or dissolved in the fluid "F". Such contaminants may include, without limitation, substances such as methylene blue ($C_{16}H_{18}N_3ClS$) and/or other aromatic organic dyes, which are dispersed during refinement of leather, textiles, pharmaceuticals, cosmetics, paper, plastics, etc. More particularly, the fluid may be guided through the channels 106 longitudinally along the A-A axis by causing the fluid "F" to enter the channels 106 along a first portion of the membrane 104 toward a second portion thereof. When the fluid "F" is guided longitudinally through the channel 106, the fluid flow is referred to as cross-flow filtration, shown in both FIG. 2B and FIG. 5B. Additionally or alternatively, when fluid "F" is guided through micropores FIG. 5A in walls of the channels 106, the flow of fluid "F" through the walls of the channels 106 is referred to as dead-end filtration. In embodiments, indents or pits (e.g., indents having a diameter of 1-2 μm) may also be formed along the channels 106 of the membrane 104 to further cause the fluid "F" flowing therethrough to interact with the walls of the channels 106.

With continued reference to FIG. 2B, as fluid containing contaminants flows through the channels 106 of the membrane 104, the contaminants interact with the nanomaterial 108, thereby breaking down or otherwise changing the state of the contaminants. By virtue of the substantially arcuate surfaces formed by the channels 106, the fluid "F" containing the contaminants comes into contact with the walls of the channels 106 as well as nanomaterials 108 disposed on the walls. As the contaminants engage the nanomaterials 108, a chemical reaction may occur which causes the contaminants to break down into non-harmful, constituent parts thereof. As the fluid "F" continues to flow through the channels 106, and the remaining contaminants further interact with the nanomaterials 108, the concentration of contaminants in the fluid "F" is reduced. In embodiments, the contaminants may bind, adhere, or otherwise couple to the nanomaterial 108, thereby causing the contaminants to be trapped in the membrane 104.

Figure 4B:
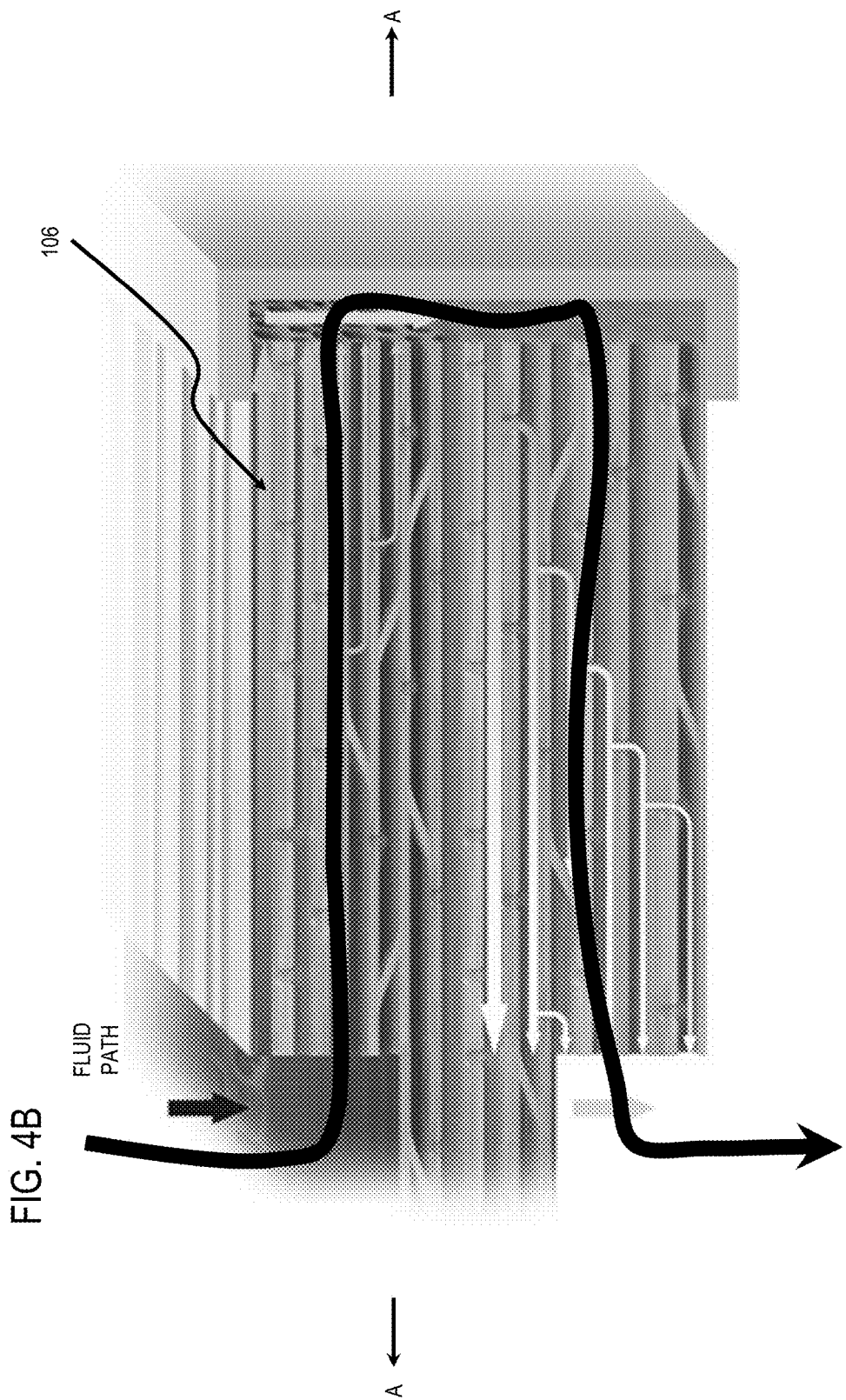
FIG. 4B is a detailed perspective view of the filtration system of FIG. 4A.

Referring now to FIGS. 4A and 4B a filter assembly is shown, the assembly referred to generally as assembly 200. The assembly 200 includes a filter compartment 202 and a reservoir housing or housing 204 configured to act as a fluid reservoir. The housing 204 is disposed above the filter compartment 202 and, when coupled thereon, forms a fluid channel with the filter compartment 202. The fluid channel is configured to guide fluid "F" along a fluid path therethrough during filtration of the fluid "F". The fluid "F" is described generally as flowing from upstream portions toward downstream portions of the filter 100'.

The filter compartment 202 is configured to receive a filter 100' therein. As shown in FIG. 4A, the filter compartment 202 is configured to slidably receive the filter 100' with a first end portion 112a and a second end portion 112b of the filter 100' engaging an inner surface of the filter compartment 202. When the filter 100' is received by the filter compartment 202, a pair of cavities 206 are formed and configured to receive fluid "F" as the fluid "F" flows downstream. More particularly, the fluid "F" flowing out of the first end portion 112a or second end portion 112b of the filter 100' is disposed within the cavity 206 associated with either the first end portion 112a or the second end portion 112b and re-enters the filter 100' via a different channel 106.

Similar to the filter 100 of FIGS. 1A-2B, the filter 100' may be treated such that a nanomaterial is disposed along the walls of the channels 106 of the filter 100'. The filter 100' additionally has an upstream and downstream trench 111 formed along the upstream and downstream portions of the membrane 104, respectively. The trenches 111 may retain any suitable shape extending inward relative to the filter 100', and disconnects a subset of the channels 106 extending through the membrane 104 along either the upstream or downstream portions of the filter 100'. As a result of disconnecting the channels 106 with an upstream trench 111a and a downstream trench 111b formed along membrane 104, the flow of fluid "F" is guided longitudinally along the A-A axis through the filter 100', thereby augmenting the fluid flow such that the fluid "F" does not primarily travel longitudinally through the channels 106. For example, as shown in FIG. 4B, fluid "F" enters the upstream trench 111a formed along the upstream portion of the membrane 104. The fluid "F" continues through the channels 106 outward and away from the upstream trench 111a towards the first end portion 112a and/or the second end portions 112b into the cavities 206.

Once the fluid "F" enters the cavities 206, the fluid "F" continues downstream and subsequently enters a channel 106 of the filter 100' along the downstream portion of the membrane 104. Once the fluid "F" enters the channel 106, the fluid "F" continues inward along the channel 106. Where the channel 106 is connected to channels 106 located adjacent thereto, the fluid "F" may be guided through channels 106 located adjacent thereto toward and through the downstream trench 111b. In embodiments, multiple filters 100' may be lined up in succession from upstream to downstream to increase the filtering performed by the filters 100'.

FIG. 6 is a flow diagram illustrating a method for forming a filtration membrane in accordance with embodiments of the present disclosure, the method referred to generally as process 300. While process 300 describes a method by which wood is adapted for use as a filtration membrane, it will be understood that other membranes such as synthetic membranes may be treated in a similar manner as described here.

Initially, a tree (FIG. 1A) may be sliced across the grain of the tree to form a wood block 102. Once sliced, a membrane 104 may be formed by trimming the membrane 104 (block 302). The membrane 104 may be optionally treated by drying, curing, or charring the membrane 104. Once the membrane 104 is sliced and optionally treated, the membrane 104 is submerged into an aqueous solution having a nanomaterial 108 suspended therein (block 304). The membrane 104 may be submerged for a predetermined period of time (e.g., from 1 to 24 hours) to allow the nanomaterial 108 to adhere or attach to the walls of the channels 106 extending along the membrane 104 (FIG. 2B).

Once submerged, if the temperature of the aqueous solution is determined not to be within a predetermined temperature range (e.g., from 1 to 200 degrees Celsius) (block 306), the aqueous solution may be heated or cooled (block 310). Once heated or cooled, if a predetermined duration of time is determined to have elapsed (block 308), the membrane 104 is removed from the aqueous solution (block 316), the membrane 104 now having the nanomaterial 108 interspersed therein. Once removed, the fluid "F" may be guided through the channels 106 of the membrane 104 to filter contaminants from the fluid "F" (FIGS. 2A and 2B). More particularly, the fluid "F" may be guided longitudinally through the channels 106 of the membrane 104 along the A-A axis. In embodiments, as illustrated by FIG. 4B, fluid "F" may be guided through the membrane 104' such that the fluid "F" is guided along a predetermined path, which causes the fluid "F" to be guided along a dead-end filter path (FIG. 5A) and/or a cross-flow filter path (FIG. 5B).

Figure 10B:
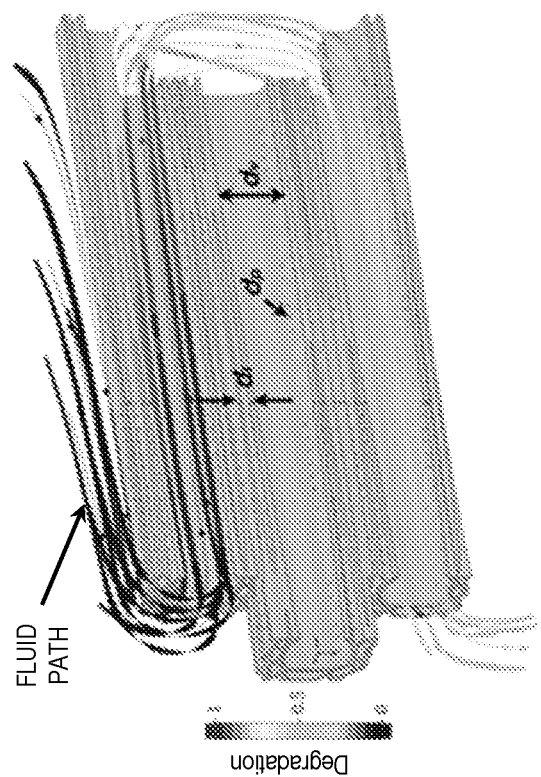
FIG. 10B is a contaminant concentration diagram illustrating changes in a contaminant concentration as fluid passes through the filter of FIG. 4A.
Figure 10A:
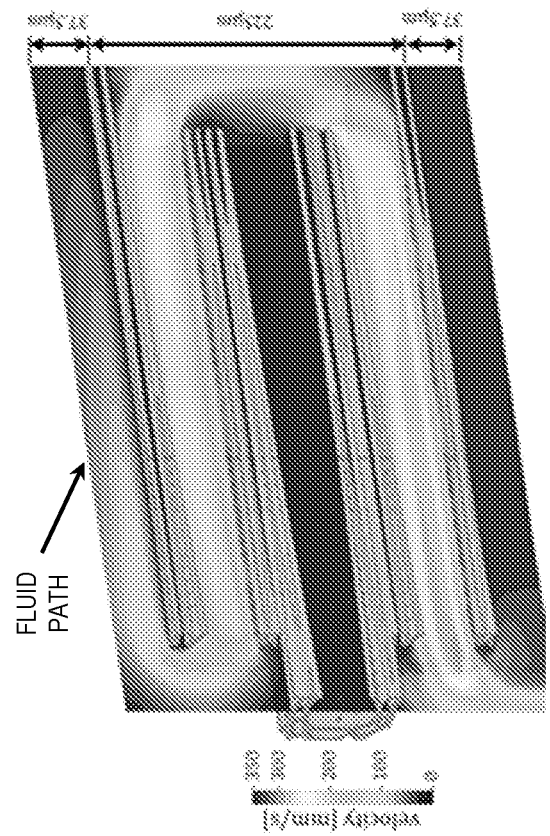
FIG. 10A is a velocity diagram of fluid passing through the filter of FIG. 4A.

The membrane 104 may be inserted into an assembly 200 (see FIG. 4A) configured to selectively guide the fluid "F" through the membrane 104 along a path (block 318) (see also FIGS. 10A and 10B, illustrating a flow velocity and contaminant concentration of the fluid "F" as the fluid passes along the path of FIG. 4B). As the fluid passes through the membrane 104 (block 312), any contaminants suspended or dissolved in the fluid "F" may be caused to come into contact with the nanomaterials 108 disposed within the channels 106 of the membrane 104. The contact between the nanomaterials 108 and the contaminants of the fluid "F" may cause the contaminants to break-down (e.g., to separate into constituent elements) or to be caught in the membrane 104. If it is determined that the membrane 104 is full (e.g., that the nanomaterials 108 have collected the contaminants therein) or that the nanomaterials 108 have reacted with the contaminants and, by virtue of the reaction, have been removed from the membrane 104 during filtration (e.g., the blank is exhausted of the nanomaterials 108) (block 314), the blank may be removed from the filtration stream (e.g., may be removed from the assembly 200) or may otherwise be caused not to receive or contact any additional fluid "F" (block 320). Once the useful filtration life of the membrane 104 is spent, the membrane 104 may be retreated (e.g., process 300 may return to block 304 and treatment of the membrane 104 may be repeated) (block 322). Alternatively, the membrane 104 may be ground and/or burnt to separate the remaining nanomaterial 108 from the channels 106 in which the nanomaterial 108 is disposed (block 322).

Figure 8:
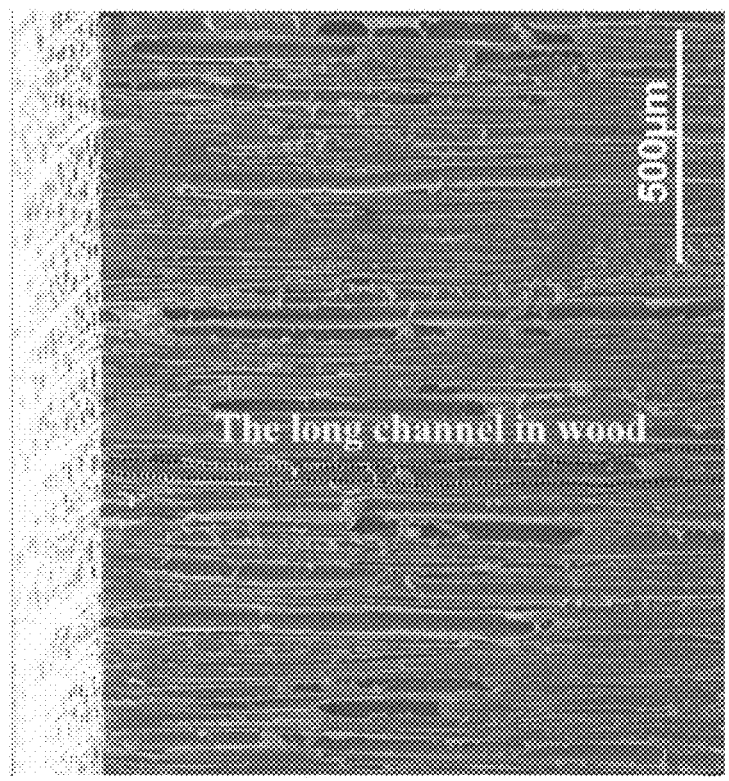
FIG. 8 is an illustration of a channel extending through the membrane of FIG. 1A.
Figure 7:
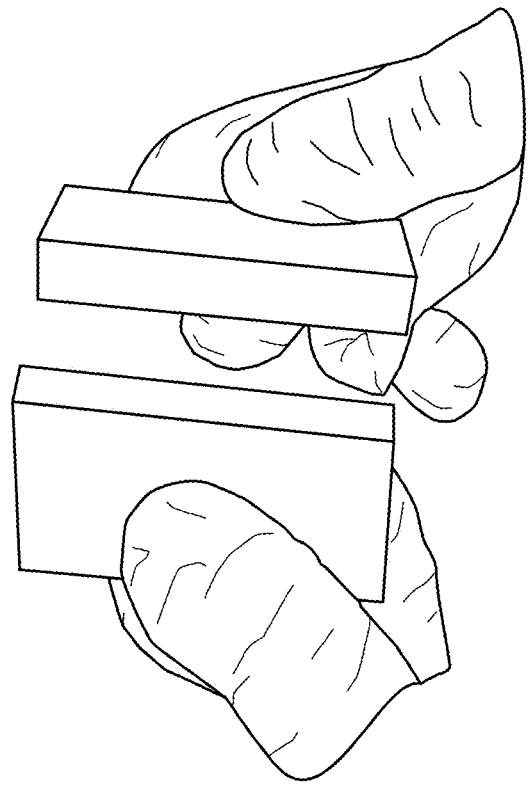
FIG. 7 is an illustration of the membrane of FIG. 2A cut along a center portion.

In an exemplary experiment, as graphically represented by FIGS. 1A, 1B, 2A, and 2B, a block of wood was cut perpendicular to the growth direction of the block of wood, which had a thickness of 5 mm along the growth direction. The wood block was treated with an aqueous solution of Palladium Chloride ($PdCl_2$) having a concentration of 1.5 mg/mL. As shown in a magnified SEM image at FIG. 8, the channels extending through the wood are aligned in substantially the same longitudinal direction. The wood was soaked in the aqueous solution for approximately twelve hours at approximately 80° Celsius. By virtue of this curing process, the Palladium Chloride was reduced to Palladium by lignin present in the wood, thereby resulting in Palladium nanoparticles forming in situ within the channels of the wood. When cut, the center of the wood also changed from the original color of the wood to black, indicating that even dispersion of the Palladium was achieved by soaking the wood in the aqueous solution (see FIG. 7).

Figure 9B:
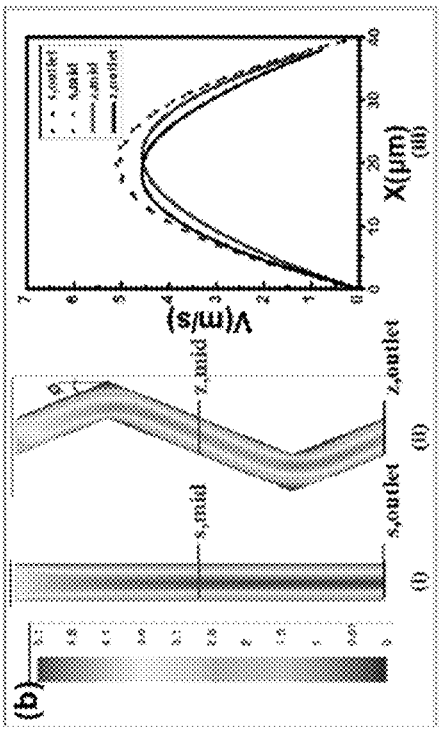
FIG. 9B is a velocity diagram of a first channel and a second channel in accordance with embodiments of the present disclosure.
Figure 9C:
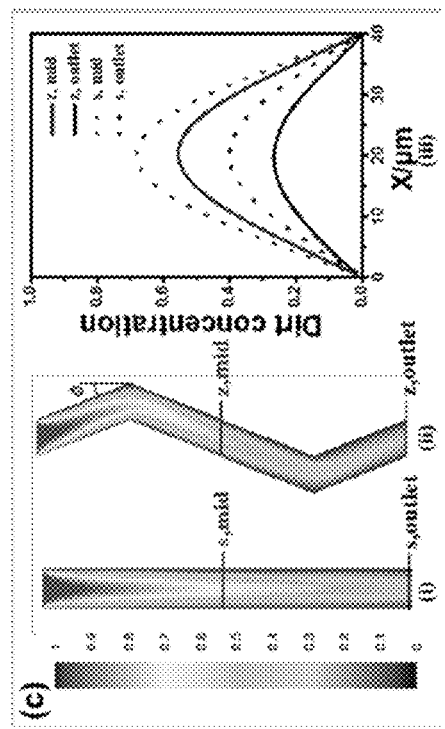
FIG. 9C is a contaminant concentration diagram illustrating changes in a contaminant concentration as fluid passes through a channel.
Figure 9A:
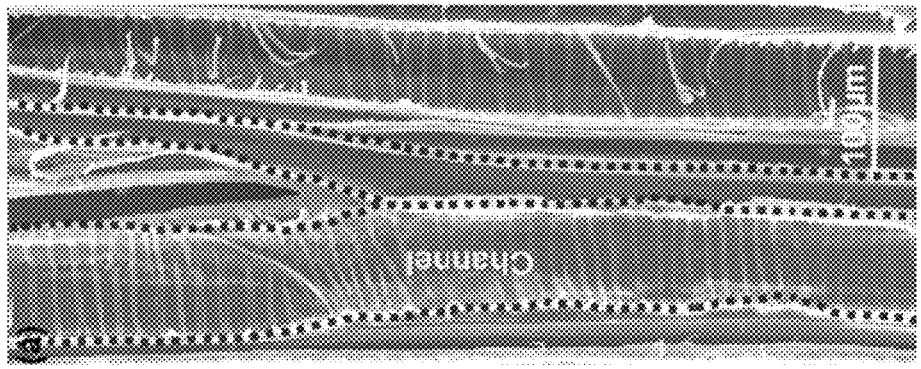
FIG. 9A is a detailed view of a pair of channels extending through the membrane of FIG. 1A.

The channels extending through the wood along the growth direction are not completely straight and have varying diameters at different points along the length of the channels (FIG. 9A-9C; illustrating SEM imagery of the channels of the wood (FIG. 9A), a flow simulation of a straight channel ("S") and a flow simulation of a zig-zag channel ("Z")). As shown in FIGS. 9B and 9C, a velocity profile of the straight channel "S" and the zig-zag channel "Z" led to differing flow rates or velocities of fluid "F" passing therethrough, as well as differing contaminant or dirt concentrations. As shown in FIG. 9C, the zig-zag channel "Z" was able to filter more contaminants from the fluid "F" than the straight channel ("S").

To verify the efficacy of the disposition of the Palladium nanoparticles in the wood as an effective filter configuration, methylene blue (identified above as an example contaminant to be targeted by filters developed in accordance with the principles of the present disclosure) was passed through the treated wood in a series of degradation tests. It was observed that the methylene blue, when in the presence of Sodium borohydride ($NaBH_4$), was degraded and the color of the solution transitioned from blue to clear or colorless when passed through the treated wood. Specifically, the treated wood filtered the methylene blue at a rate of 99.8%. Additionally, recovery of the Palladium nanoparticles was determined to be possible by "burning out" or otherwise incinerating the wood, allowing for separation of the Palladium nanoparticles therefrom. For additional detail as to the formation and performance of a wood membrane configured to filter for contaminants, reference may be made to the attached paper entitled "Mesoporous, Three-Dimensional Wood Membrane with Aligned Channels for Highly Efficient Water Treatment," by Chen et al., published by the Department of Mechanical Engineering at the University of Maryland at College Park, Md., the contents of which are hereby incorporated by reference in their entirety.

What is claimed is:

1. A method of treating a membrane, the method comprising:
   cutting a first trench across at least one of an upstream portion of the membrane or a downstream portion of the membrane;
   causing a nanomaterial to contact at least a portion of a wall of a plurality of channels extending through a membrane, the membrane comprising a block including the plurality of channels extending therethrough; and causing the nanomaterial to adhere to the portion of the wall of the plurality of channels, wherein the trench cuts across the plurality of channels.

2. The method of claim 1, further comprising forming a pattern in at least one of a top portion of the membrane or a bottom portion of the membrane, wherein the pattern is formed by positioning the plurality of channels relative to one another and to at least one of the top portion of the membrane or the bottom portion of the membrane.

3. The method of claim 2, wherein the pattern is selected from the group consisting of a hatch pattern, a saw-tooth pattern, a straight pattern, a zig-zag pattern, a recurring arcuate pattern, and any combination thereof.

4. The method of claim 1, further comprising:
cutting a second trench across at least one of the upstream portion of the membrane or the downstream portion of the membrane, the second trench intersecting the first trench.

5. The method of claim 1, further comprising, after causing the nanomaterial to adhere to the portion of the wall of the plurality of channels, at least one of curing the membrane, increasing a temperature of the membrane to a predetermined temperature, drying the membrane, or charring the membrane.

6. The method of claim 1, wherein the nanomaterial includes at least one of nanoparticles, nanowires, nanotubes, or graphene.

7. The method of claim 1, wherein the nanomaterial is made of least one of titanium dioxide, a metal, an oxide, a polymer, gold, copper, nickel, silver, or an alloy.

8. The method of claim 1, wherein the membrane comprises porous wood having channels extending therethrough.

9. The method of claim 8, wherein the wood is selected from the group consisting of surface-treated wood, heat-treated wood, natural wood, synthetic wood, partially delignified wood, completely delignified wood, carbonized wood, and any combination thereof.

10. The method of claim 1, further comprising cutting the membrane across the at least one channel of the plurality of channels prior to cutting the first trench.

11. The method of claim 10, wherein cutting the membrane across the at least one channel of the plurality of channels includes cutting the membrane at an angle with respect to the at least one channel.

12. A fluid filtration system comprising:
a housing having a reservoir and a filter compartment; and
a filter membrane comprising a block having a plurality of channels extending therethrough, the plurality of channels having a plurality of micropores along a wall of at least one channel of the plurality of channels,
wherein the filter compartment is configured to receive the filter membrane therein,
wherein the filter membrane is configured to guide fluid thereacross to remove substances from the fluid or to modify substances in the fluid,
wherein at least one channel of the plurality of channels has a nanomaterial disposed along at least a portion of a wall of the at least one channel,
wherein the filter membrane has a first trench extending along a first surface of the filter membrane; and
wherein the trench cuts across the plurality of channels.

13. The fluid filtration system of claim 12, wherein the filter membrane has an upstream channel portion extending therethrough and a downstream channel portion extending therethrough, the upstream channel portion configured to guide fluid in a first direction and the downstream channel portion configured to guide fluid in a second direction.

14. The fluid filtration system of claim 13, wherein the upstream channel portion and the downstream channel portion are configured to guide fluid in a cascade configuration.

15. The fluid filtration system of claim 12, wherein the membrane has a second trench extending along a second surface of the filter membrane.

16. The fluid filtration system of claim 12, wherein the filter compartment is configured to extend past at least one end portion of the filter membrane to form a cavity between the filter compartment and the end portion of the filter membrane.

17. The fluid filtration system of claim 16, wherein the fluid is guided from a first channel having a plurality of micropores to a second channel.

18. A membrane comprising:
a block including an upper portion and a lower portion;
a plurality of channels extending through the block from the upper portion of the membrane toward the lower portion of the membrane; and
a nanomaterial disposed along walls of the plurality of channels, the nanomaterial configured to chemically interact with fluid flowing through the plurality of channels of the membrane,
wherein a first trench is cut across at least one of an upstream portion of the membrane or a downstream portion of the membrane, and
wherein the trench cuts across the plurality of channels.

19. The membrane of claim 18, wherein the membrane is cut across at least one of the channels.

20. The membrane of claim 18, wherein the membrane is cut at an angle relative to at least one of the channels.

21. The membrane of claim 18, wherein a pattern is formed along either the upper portion of the membrane, the lower portion of the membrane, an upstream portion of the membrane, or a downstream portion of the membrane.

22. The membrane of claim 21, wherein the pattern is a pattern selected from the group consisting of a hatch pattern, a saw-tooth pattern, a straight pattern, a zig-zag pattern, a recurring arcuate pattern, and any combination thereof.

23. The membrane of claim 18, wherein a second trench is cut across at least one of the upstream portion of the membrane or the downstream portion of the membrane, the second trench intersecting the first trench.

24. The membrane of claim 18, wherein the nanomaterial includes at least one of nanoparticles, nanowires, nanotubes, or graphene.

25. The membrane of claim 18, wherein the nanomaterial is formed of a material selected from the group consisting of titanium dioxide, a metal, an oxide, a polymer, gold, copper, nickel, silver, an alloy, and any combination thereof.

26. The membrane of claim 18, wherein the membrane is wood selected from the group consisting of surface-treated wood, heat-treated wood, natural wood, synthetic wood, partially delignified wood, completely delignified wood, carbonized wood, and any combination thereof.

* * * * *